(12) United States Patent
Rey et al.

(10) Patent No.: US 7,543,490 B2
(45) Date of Patent: Jun. 9, 2009

(54) TIRE COMPRISING A FORCE MEASURING DEVICE HAVING A RIGID STEM

(75) Inventors: Patrice Rey, Saint Jean De Moirans (FR); Philippe Robert, Grenoble (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/912,739

(22) PCT Filed: Apr. 24, 2006

(86) PCT No.: PCT/EP2006/061795

§ 371 (c)(1),
(2), (4) Date: Oct. 26, 2007

(87) PCT Pub. No.: WO2006/117309

PCT Pub. Date: Nov. 9, 2006

(65) Prior Publication Data

US 2008/0148836 A1   Jun. 26, 2008

(30) Foreign Application Priority Data

May 4, 2005 (FR) .................................. 05 04521

(51) Int. Cl.
*G01M 17/02* (2006.01)
(52) U.S. Cl. ...................................... 73/146; 152/152.1
(58) Field of Classification Search .................... 73/146; 152/152.1
See application file for complete search history.

(56) References Cited

U.S. PATENT DOCUMENTS

| 5,502,433 | A | 3/1996 | Breuer et al. ................ 340/438 |
| 5,864,056 | A | 1/1999 | Bell et al. |
| 6,666,079 | B2 | 12/2003 | Poulbot et al. ................. 73/146 |
| 6,991,013 | B2 | 1/2006 | Poulbot et al. ........... 152/152.1 |
| 7,267,148 | B2 | 9/2007 | Merino-Lopez et al. .. 152/152.1 |
| 2003/0056579 | A1 | 3/2003 | Poulbot et al. |
| 2004/0036590 | A1 | 2/2004 | Elsner et al. ................. 340/445 |
| 2005/0188756 | A1* | 9/2005 | Morikawa ..................... 73/146 |
| 2006/0207319 | A1* | 9/2006 | Krozer et al. ................. 73/146 |

(Continued)

FOREIGN PATENT DOCUMENTS

DE  42 42 726 A1  6/1994

(Continued)

OTHER PUBLICATIONS

International Search Report dated Jun. 19, 2006, in PCT/EP2006/061795.

*Primary Examiner*—Andre J Allen
(74) *Attorney, Agent, or Firm*—Fitzpatrick, Cella, Harper & Scinto

(57) ABSTRACT

A tire is provided with a force measurement device embedded, for example, in an isolated element such as a tread block. The device may be a stud-type device. The device includes a rigid stem connected to a deformable substantially flat membrane, which includes a detector for detecting a deformation of the membrane. The stem further includes a portion designed to be in contact with an element on which a force can act. The stem also includes an anchor that collaborates with the element. The anchor functions to improve the transmission of a load to the deformable membrane.

15 Claims, 12 Drawing Sheets

U.S. PATENT DOCUMENTS

2007/0295074 A1* 12/2007 Kobayakawa .............. 73/146.5
2008/0011092 A1* 1/2008 Miyoshi et al. ............... 73/779

FOREIGN PATENT DOCUMENTS

| | | |
|---|---|---|
| DE | 102 42 121 A1 | 3/2004 |
| DE | 10 2004 051 654 A1 | 4/2006 |
| EP | 1 350 640 A1 | 10/1983 |
| EP | 0 937 615 A2 | 8/1999 |
| EP | 1 076 235 A1 | 2/2001 |
| EP | 1 231 120 A1 | 8/2002 |
| EP | 1 498 291 A1 | 1/2005 |
| WO | WO 02/08721 A1 | 1/2002 |
| WO | 2006/117480 A1 | 11/2006 |

* cited by examiner

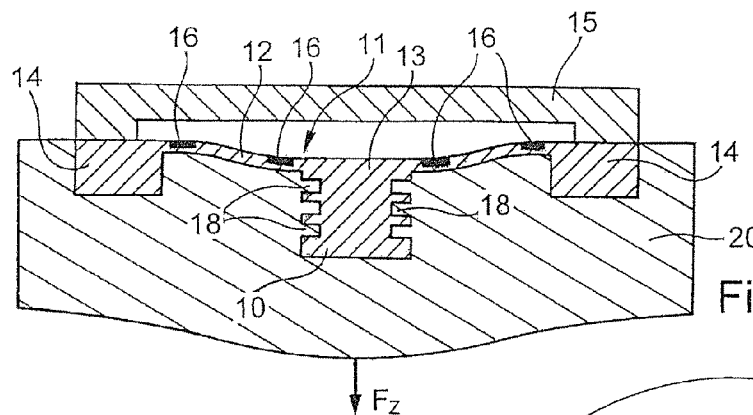
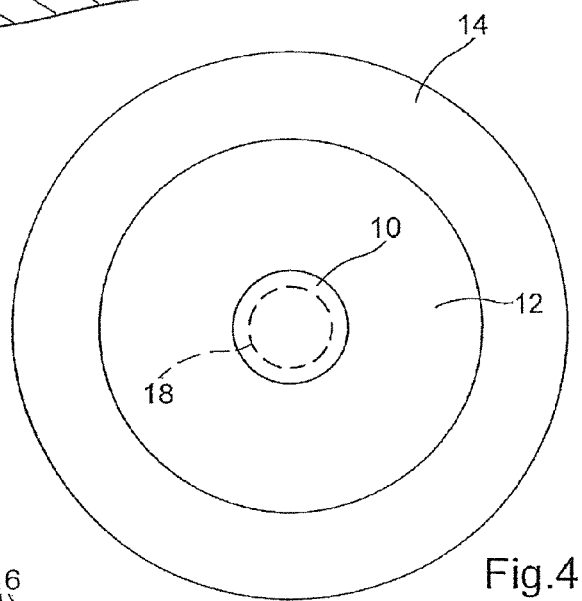
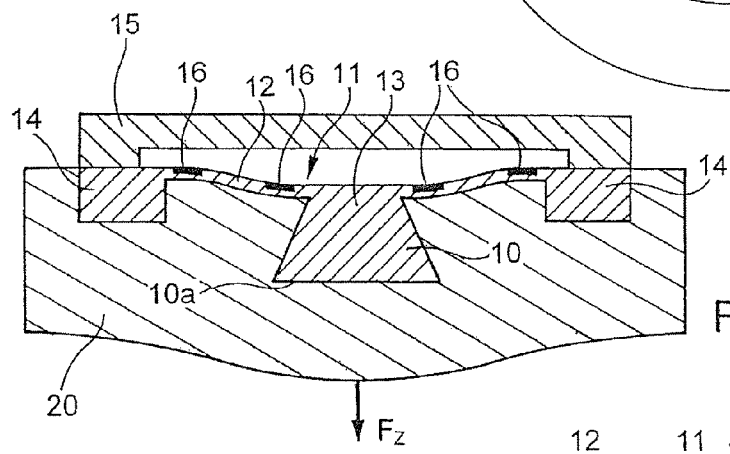
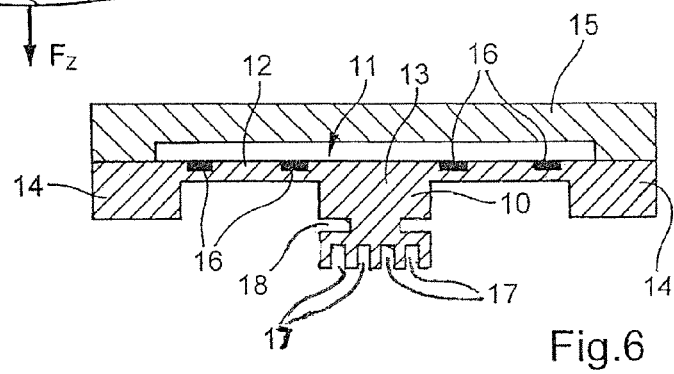

TIRE COMPRISING A FORCE MEASURING DEVICE HAVING A RIGID STEM

The present invention relates to a tire equipped with a force measurement device.

In general, the present invention relates to a tire equipped with a force measurement device that includes a rigid stem connected to a deformable substantially flat membrane, which includes a detector for detecting a deformation of this membrane.

It is aimed at the field of sensors of any kind of force (angular or linear pressure force, tensile force, moment or acceleration).

A tire equipped with a force sensor such as this is described in particular in document U.S. Pat. No. 6,666,079.

The rigid stem of the force measurement device includes at least one portion, which may be the whole of the stem, that is designed to be in contact with an element on which the force that is to be measured is able to act.

The stem thus allows the load applied to the element to be transmitted to the deformable membrane, the deformation of which is proportional to the load that is to be measured.

It is an object of the present invention to allow the loads that are to be measured to be transmitted effectively.

To this end, the present invention proposes to equip a tire with a force measurement device that includes a rigid stem connected to a deformable substantially flat membrane, which includes a detector for detecting a deformation of the membrane. The stem includes at least one portion designed to be in contact with an element on which the force can act.

According to an aspect of the invention, the stem portion includes an anchor designed to collaborate with the element.

Thus, in contrast with the prior art, in which the stem of the sensor generally has a plain cylindrical shape, the anchor improves the adhesion between the stem and the element in contact.

This improved adhesion or anchorage makes it possible to achieve effective transmission of the load, particularly when the force to which the element is subjected is a tensile force, which tends to detach the element from the force measurement device, and in the case of repeated cycle stresses.

This then prevents the creation of a flaw in the element in contact with the sensor, which may lead to errors in the measurement of the loads applied and, possibly, to partial or total destruction of the element collaborating with the stem of the force measurement device.

According to one embodiment of the invention, the anchor includes crenellations perpendicular to the membrane to improve the transmission of force tangential to the rigid stem.

Alternatively, or in addition, the anchor includes crenellations parallel to the membrane, to improve the transmission of a normal force that runs along the axis of the stem.

Alternatively, or in addition, the anchor is formed at a widened portion of the stem, increasing the area of contact between the stem and the element on which a force acts.

The present invention is advantageously implemented when the stem portion is embedded in the element on which the force acts.

Other particular features and advantages of the invention will become further apparent from the description which follows, considered in conjunction with the attached drawings.

In the attached drawings, which are given by way of non-limiting examples:

FIG. 3 is a schematic view in cross section of a force measurement device according to a second embodiment of the invention;

FIG. 4 is a view from below of the force measurement device of FIG. 3;

FIG. 5 is a schematic view in cross section of a force measurement device according to a third embodiment of the invention;

FIG. 6 is a schematic view in cross section of a force measurement device according to a fourth embodiment of the invention;

Figure 1:
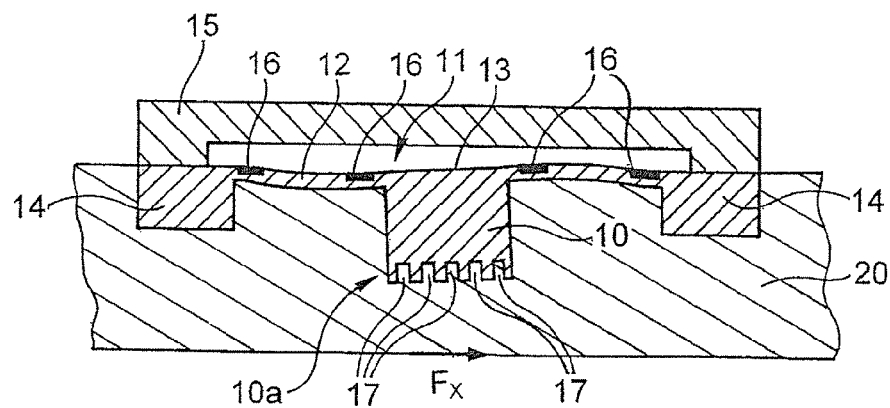
FIG. 1 is a schematic view in cross section of a force measurement device according to a first embodiment of the invention.

For the purposes of clarity, the various elements shown in the drawings have not been drawn to scale.

A first embodiment of a force measurement device according to the invention will be described with reference to FIGS. 1 and 2.

The force sensor illustrated has a particular structure of the "stud" type. It includes a rigid stem 10 surmounted by a head 11.

This head 11 includes a deformable and substantially flat membrane 12 capable of deforming when the rigid stem 10, here connected to the center of the membrane 12, is acted upon by a force or a moment or alternatively when the complete structure of the measurement device is subjected to the action of an acceleration, the stem 10 then forming a seismic mass.

In this exemplary embodiment, the deformable membrane 12 is a solid circular membrane, its connection to the stem 10 being in a central region 13.

Of course, this deformable membrane 12 could have a different structure and, for example, could be produced from various arms extending from the central region 13 to a peripheral region 14 of the membrane 12.

This peripheral region 14 includes anchoring points, which have a stable position with respect to the stem 10, whether or not the membrane 12 is deformed. There are a number of continuous anchoring points in this example, extending over the peripheral region 14 of the membrane 12.

There is also a cap 15 to cover the membrane 12 from some distance away, on the opposite side to the side bearing the rigid stem 10.

This deformable membrane 12 further includes a detector for detecting its deformation, the detector consisting, for example, of piezoresistive gauges 16 aligned in various directions within the plane of the membrane 12.

The detector may, for example, include eight piezoresistive gauges mounted in fours in a double Wheatstone bridge, aligned in two directions perpendicular to the plane of the deformable membrane 12.

The imbalance measured across the Wheatstone bridge is directly proportional to the deformation of the membrane 12 in the direction associated with the Wheatstone bridge.

In order to detect the deformation of the membrane 12 and to measure the force associated with this device, reference will advantageously be made to the description in U.S. Pat. No. 6,666,079.

In this embodiment of the present invention, a stem portion, here corresponding to the free end 10a of the stem 10, is structured with an anchor 17.

The anchor 17 includes crenellations 17 perpendicular to the plane of the membrane 12.

Figure 2B:
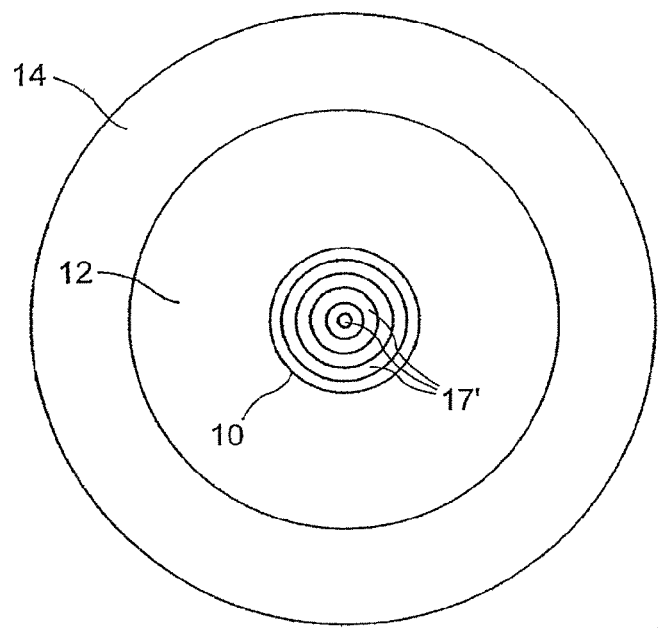
FIGS. 2A and 2B are two views from below of the force measurement device of FIG. 1.
Figure 2A:
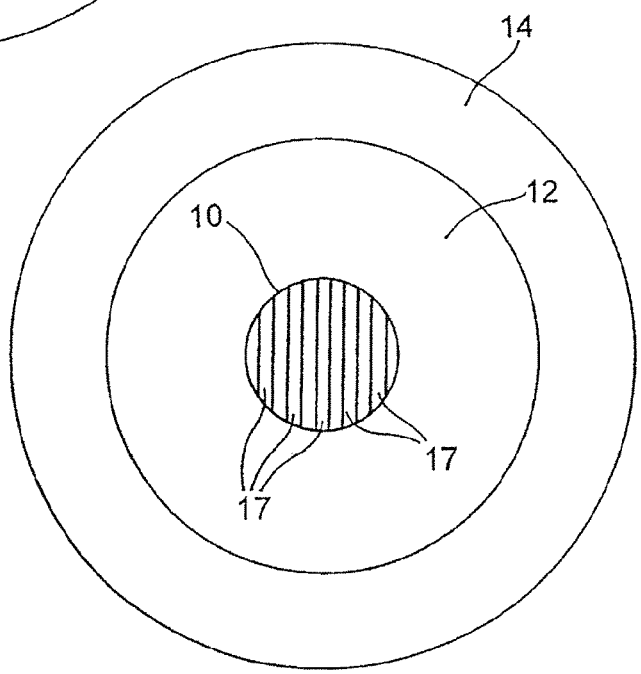

As is clearly illustrated in FIG. 2A, these crenellations 17 run parallel to one another in a plane corresponding to the end face of the free end 10a of the stem 10.

These crenellations 17, running perpendicular to the membrane 12, thus open toward the free end 10a of the stem 10. They thus form grooves of square or rectangular cross section, which are open toward the end face of the free end 10a of the stem 10.

In this embodiment, in which at least the free end 10a of the stem 10 is designed to be embedded in an element 20, these crenellations 17 improve the anchorage of the stem 10 in this element 20.

FIG. 2B shows an alternative embodiment of the crenellations. The crenellations 17' are circular grooves that are open toward the end face of the free end 10a of the stem 10 and positioned concentrically. They also improve the anchorage of the stem 10 in the element 20.

FIG. 1 illustrates the force measurement device in which the whole of the device, that is, the head 11 and the stem 10 of the sensor, is embedded in the material of the element 20. In FIG. 1, the element 20 is subjected to the action of a force Fx that is tangential to the axis of the stem 10.

The load to which the element 20 is subjected may thus be transmitted perfectly to the stem 10 by virtue of the adhesion and anchorage that are improved through the presence of the crenellations 17. Because these crenellations 17 run perpendicular to the plane of the membrane 12, anchorage is particularly improved when the force applied to the element 20 runs in the plane of this membrane 12.

A second embodiment of the invention will now be described with reference to FIGS. 3 and 4.

The elements that are identical to the embodiment described previously, and that bear the same numerical references, will not be described again in detail here.

The depth must not weaken the stem, which must remain rigid under the action of the applied loads. A depth of the order of ¼ of the dimension concerned is a correct value.

In this embodiment, the stem 10 includes, within its height, an anchor that is formed of crenellations 18 parallel to the plane of the membrane at rest.

As is clearly illustrated in FIG. 4, these crenellations 18 are annular and open toward the periphery of the rigid cylindrical stem 10. In this embodiment, three circular crenellations 18 are superposed along the longitudinal axis of the stem 10.

These crenellations 18 are formed of annular grooves of square or rectangular cross section, one side of which opens toward the longitudinal wall of the stem 10.

Of course, just one crenellation could be provided in the body of the stem 10, or alternatively, the number of crenellations could be equal to two or greater.

Because the crenellations 18 open toward the longitudinal wall of the stem 10, the anchor formed of these crenellations 18 is particularly well suited to transmitting a load to the membrane 12 when the force F2 acting on the stem 10 is normal, that is, along the axis of the stem 10 and perpendicular to the membrane 12.

FIG. 3 illustrates the sensor embedded in an element 20, the latter being subjected to a tensile force F2 that has a tendency to detach the element 20 from the stem 10.

Because of the presence of the crenellations 18, the stem 10 is better anchored in the element 20.

A third embodiment will now be described with reference to FIG. 5. Those elements that are common to the previous embodiments bear the same numerical references.

In this embodiment, the stem is structured in such a way that an anchor is formed at a widened portion of the stem 10.

This widened portion has the shape of a cone frustum, the widened base of the cone frustum constituting a free end 10a of the stem 10.

In this embodiment in which the sensor is embedded in an element 20, when the acting force F2 is perpendicular to the membrane 12, this widened portion of the free end 10a of the stem provides a mechanical anchorage favorable to the transmission of the load to the membrane 12.

Of course, in the foregoing embodiments, the sensor has been illustrated wholly embedded in an element 20, for example an element made of a flexible material of the rubber type.

A fourth embodiment will now be described with reference to FIG. 6. Those elements that are common to the foregoing embodiments bear the same numerical references.

In this embodiment, the stem 10 includes an anchor formed of crenellations 17 perpendicular to the membrane 12 and crenellations 18 parallel to the membrane 12.

Here, the force measurement device includes crenellations 17 opening toward the free end wall 10a of the stem 10 and a crenellation 18 opening toward the longitudinal wall of the stem 10.

The two types of crenellations described previously with reference to the first and second embodiments of the invention can thus be combined.

Of course, the other embodiments described hereinabove may be combined.

Figure 7:
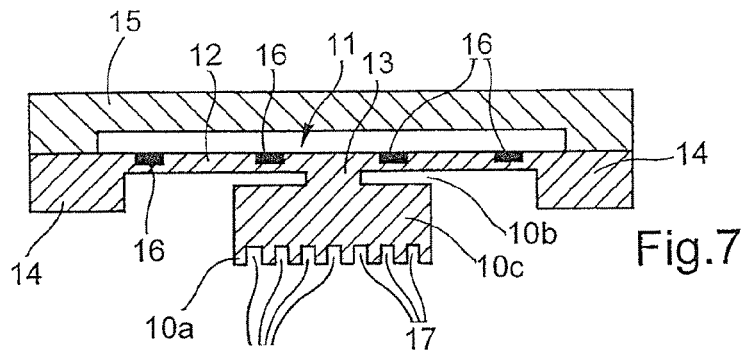
FIG. 7 is a schematic view in cross section of a force measurement device according to a fifth embodiment of the invention.

In particular, as is clearly illustrated in FIG. 7 in a fifth embodiment, the stem 10 may have both a widened portion 10c and crenellations 17 running perpendicular to the plane of the membrane 12.

Thus, in this embodiment, the stem 10 has a first part 10b of smaller diameter, connected to the central region 13 of the membrane 12. This smaller-diameter portion 10b is attached to a larger-diameter part 10c, providing better anchorage of the stem 10 in an element on which a force acts.

The two stem parts 10b, 10c in this embodiment are cylindrical and coaxial.

Figure 8:
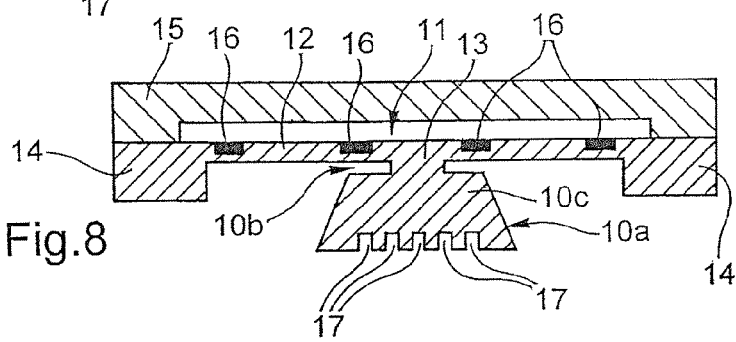
FIG. 8 is a schematic view in cross section of a force measurement device according to a sixth embodiment of the invention.

Alternatively, as illustrated in a sixth embodiment, shown in FIG. 8, the widened portion 10c of the stem 10 may also have a frustoconical shape, as described previously with reference to FIG. 5.

The widened portion 10c is connected by a smaller-diameter portion 10b to the central region 13 of the membrane 12.

A structure such as shown in FIG. 8 improves both the transmission of tangential forces and the transmission of forces that are perpendicular to the plane of the deformable membrane 12.

Figure 9:
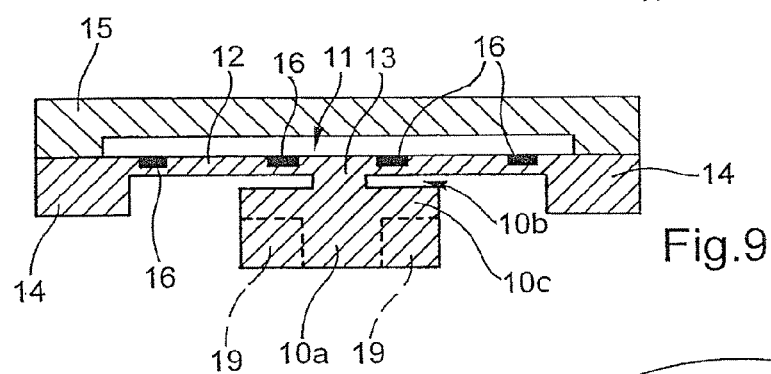
FIG. 9 is a schematic view in cross section of a force measurement device according to a seventh embodiment of the invention.

A seventh embodiment of the invention will now be described with reference to FIGS. 9 and 10.

As in the embodiments described with reference to FIG. 7, the stem 10 has a portion 10c attached by a smaller-diameter portion 10b to the central region 13 of the membrane 12.

Figure 10:
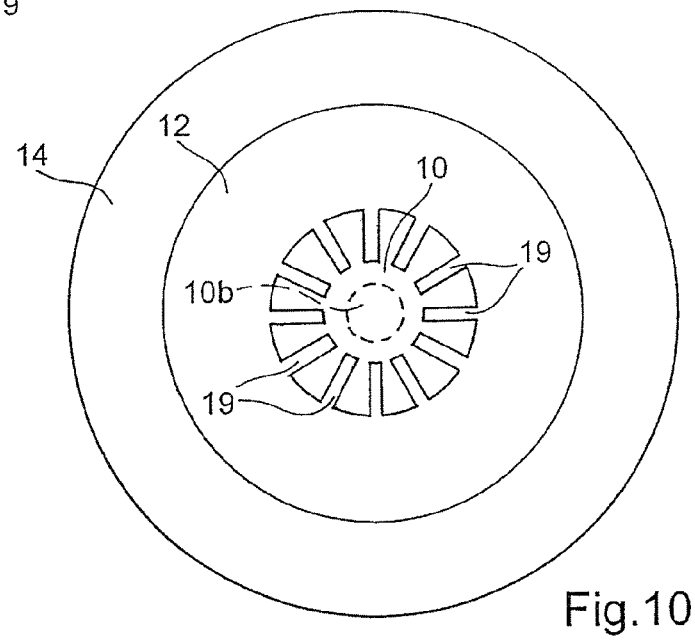
FIG. 10 is a view from below of the force measurement device of FIG. 9.

The free end 10a includes crenellations 19, which are clearly illustrated in FIG. 10 and which open both toward a longitudinal wall of the stem 10 and toward the end face of the free end 10a of the stem 10.

The crenellations 19 are preferably distributed symmetrically with respect to the longitudinal central axis of the stem 10, and are shown in FIG. 10 to be distributed evenly about the periphery of the cylindrical stem 10.

The anchor formed by the crenellations 19 improve not only the transmission of tangential forces but also the transmission of any moment to which the stem 10 is subjected.

Of course, the embodiments described above are exemplary and are not in any way limiting. The embodiments may be combined with one another to improve the anchorage of the stem 10 in an element on which a force that is to be measured acts.

Furthermore, the number and shape of the crenellations 17, 18, 19 are not limited to those shown in the drawings.

A first method of manufacture for producing crenellations perpendicular to the membrane 12 will now be described with reference to FIGS. 11a to 11k.

The manufacturing method described herein uses microtechnology (sometimes referred to as microfabrication) techniques.

Figure 11A:
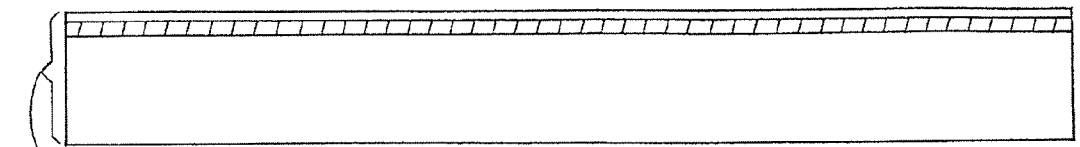
FIGS. 11a to 11k are diagrams illustrating a series of steps involved in a method of manufacturing a measurement device according to an embodiment of the invention.
Figure 11B:
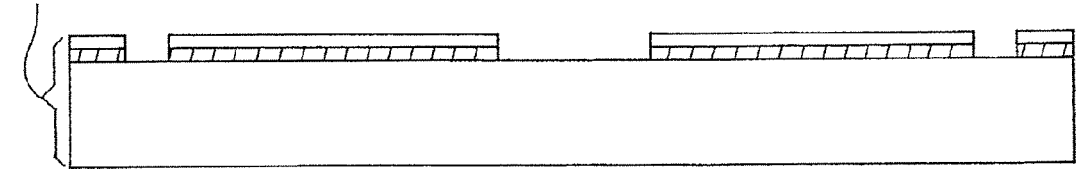

Starting from an SOI (Silicon On Insulator) substrate, like the one schematically illustrated in FIG. 11a, surface layers are etched as illustrated in FIG. 11b.

Figure 11C:
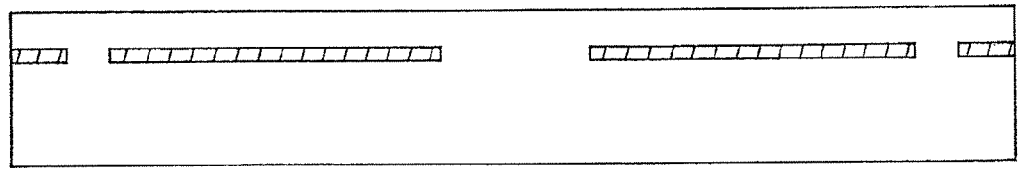

An epitaxial growth technique, which involves growing a layer of monocrystalline Si from the monocrystalline Si surface of the SOI substrate, is then employed to grow an epitaxial layer of Si, as illustrated in FIG. 11c.

Figure 11D:
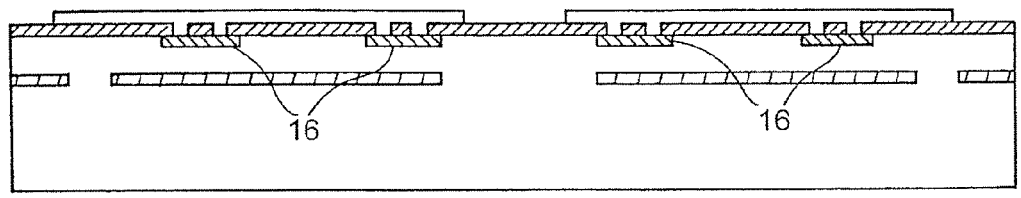

Piezoresistive gauges that will server as the detector and various conductors that will serve to connect and to mount the gauges in a Wheatstone bridge configuration are then installed on an upper face of the substrate, as illustrated in FIG. 11d.

Figure 11E:
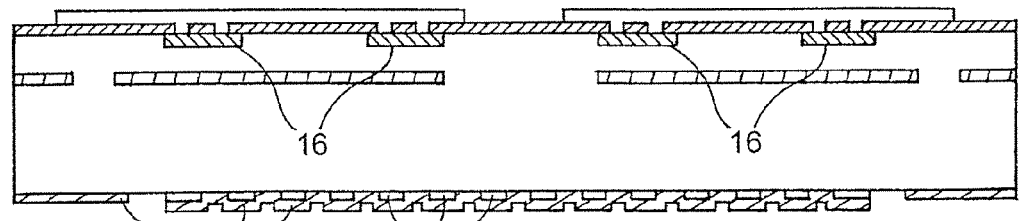

A double mask 30, 31 is then produced on the underside of the substrate, as illustrated in FIG. 11e.

Figure 11F:
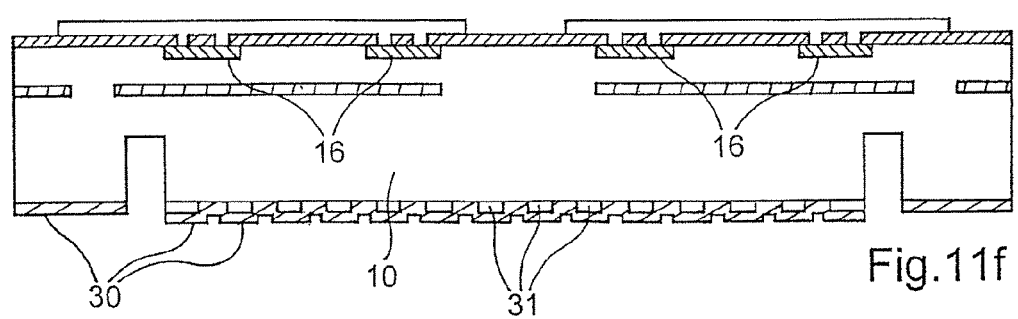

A deep first etching operation, as illustrated in FIG. 11f, then is used in the formation of the stem 10.

Figure 11G:
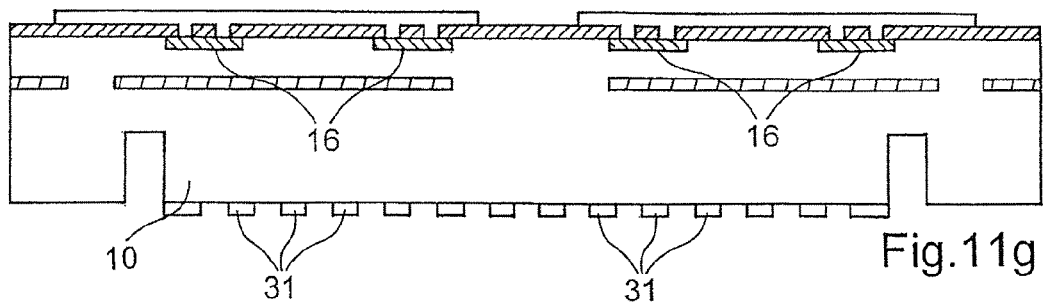

After the first mask 30 is then removed, as illustrated in FIG. 11g, the second mask 31 remains in place so that a series of crenellations opening toward the free end of the stem 10 that is being formed can be defined.

As shown in FIG. 11g, the second mask 31 forms a series of parallel strips spaced apart with a uniform spacing.

Figure 11H:
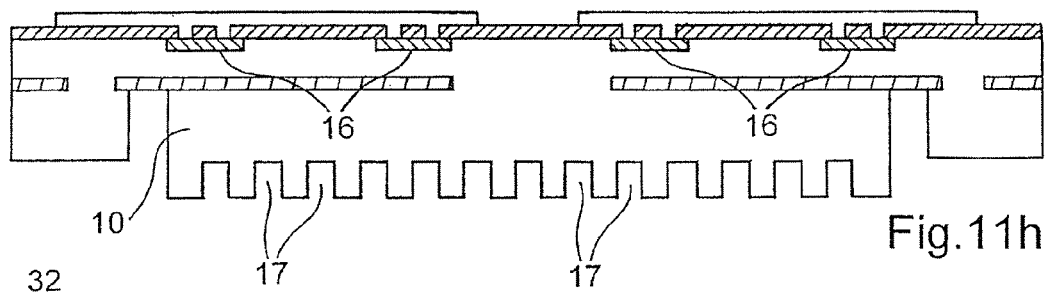

As illustrated in FIG. 11h, a deep second etching operation is performed, then the second mask 31 is removed. The crenellations 17 are thus formed.

Figure 11I:
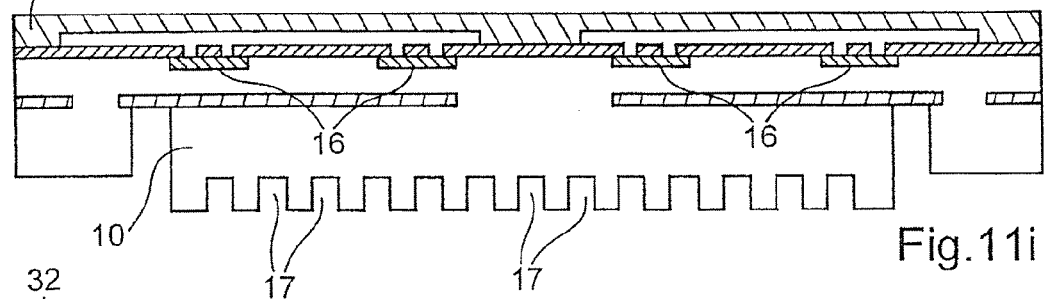

In FIG. 11i, a protector 32 to protect the upper face bearing the detector and the conductors is fitted.

Figure 11J:
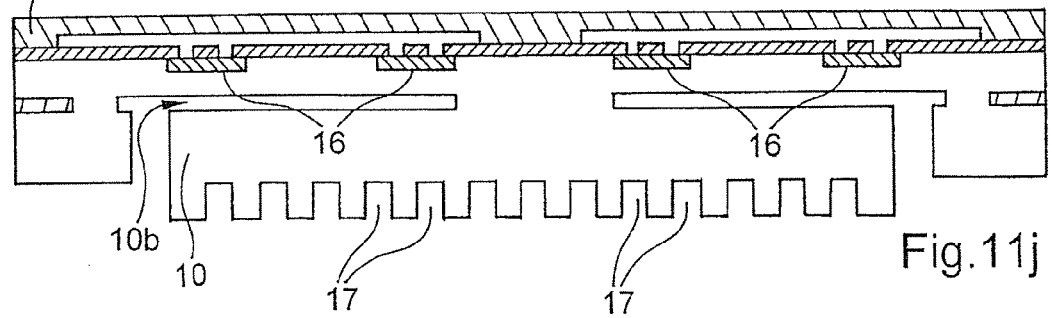

Then, as illustrated in FIG. 11j, a sacrificial oxide layer of the SOI substrate is etched to obtain the smaller-diameter portion 10b of the stem 10.

Figure 11K:
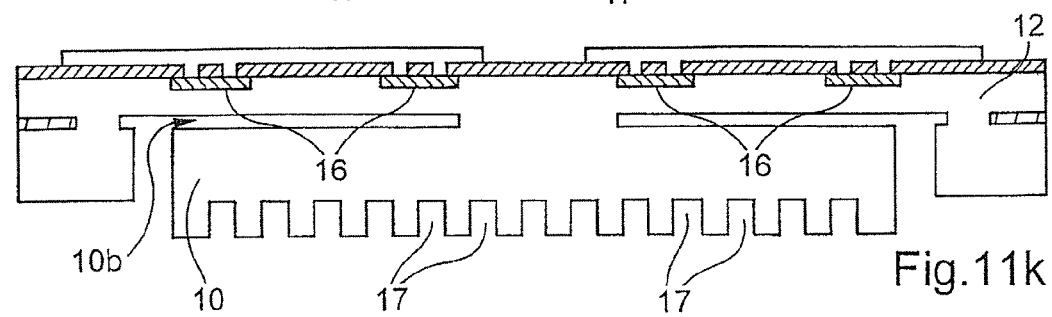

Finally, the protector 32 protecting the upper face is removed, as illustrated in FIG. 11k.

A second method of manufacturing a force measurement device according to an embodiment of the invention, in which the stem includes a crenellation running parallel to the plane of the membrane 12, will now be described with reference to FIGS. 12a to 12k.

As before, microtechnology (microfabrication) techniques are used.

Figure 12A:
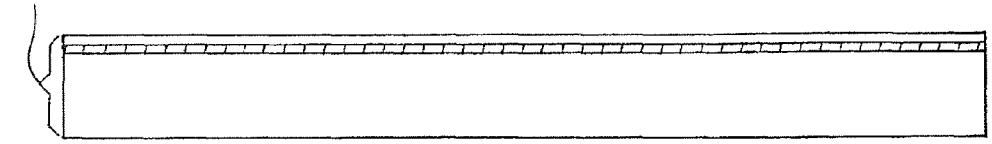
FIGS. 12a to 12k are diagrams illustrating the steps involved in a method of manufacturing a measurement device according to another embodiment of the invention.
Figure 12B:
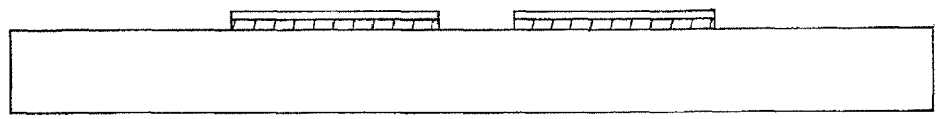
Figure 12C:
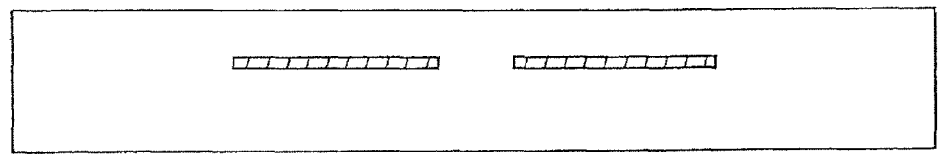

Starting with an SOI substrate, as illustrated in FIG. 12a, the surface layers are etched, as illustrated in FIG. 12b. Then an epitaxial growth process is performed, as illustrated in FIG. 12c.

Figure 12D:
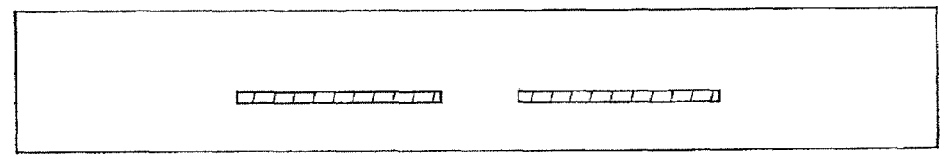

In this manufacturing method, the faces of the substrate are reversed, as illustrated in FIG. 12d, with the upper face becoming the underside and vice versa.

Figure 12E:
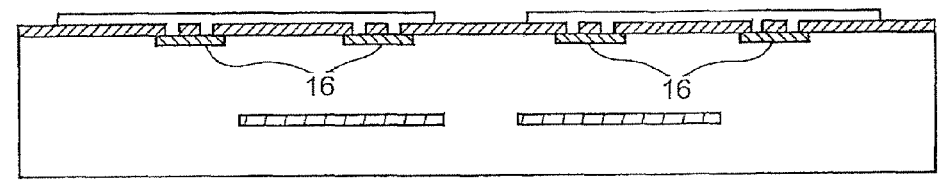

Next, as illustrated in FIG. 12e, the detector 16 is produced and electrically connected in a known way on an upper face of the substrate.

Figure 12F:
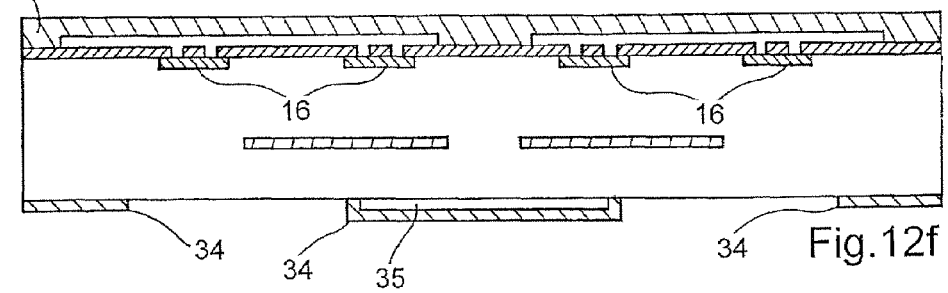

The upper face of the substrate is then protected with a protector layer 33, for example, using a layer of resin, and a double mask 34, 35 is applied to the underside of the substrate, as illustrated in FIG. 12f. This double mask 34, 35 may be achieved using an oxide under a resin.

Figure 12G:
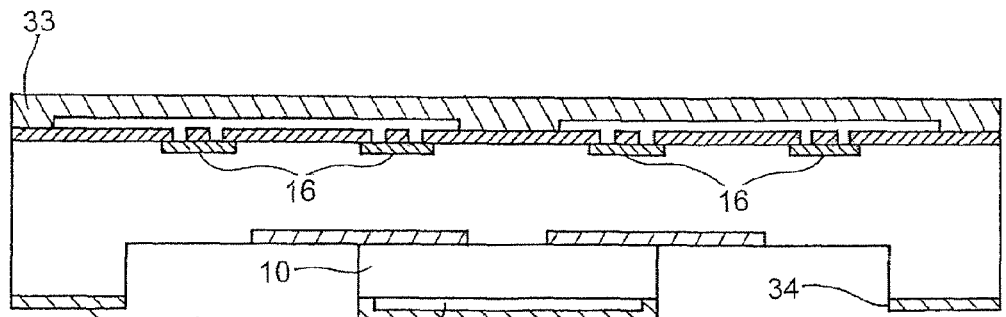

A first deep etching operation is used in the formation of the structure of the stem 10 of the sensor, as illustrated in FIG. 12g.

Figure 12H:
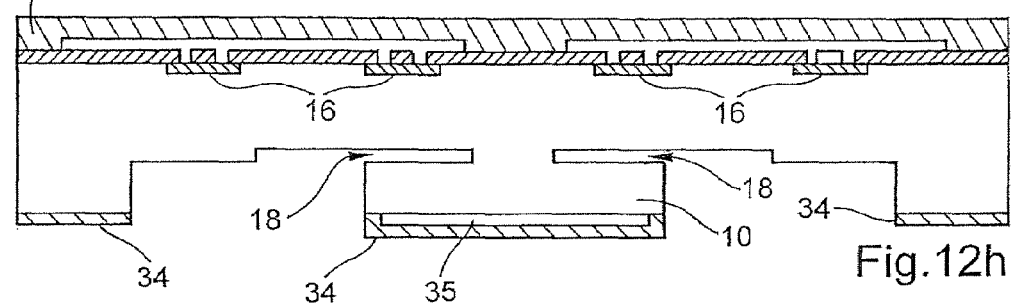

As illustrated in FIG. 12h, a wet etching of the underside of the substrate allows the sacrificial oxide layer to be etched in such a way as to produce a crenellation 18 running parallel to the plane of the membrane 12.

Figure 12I:
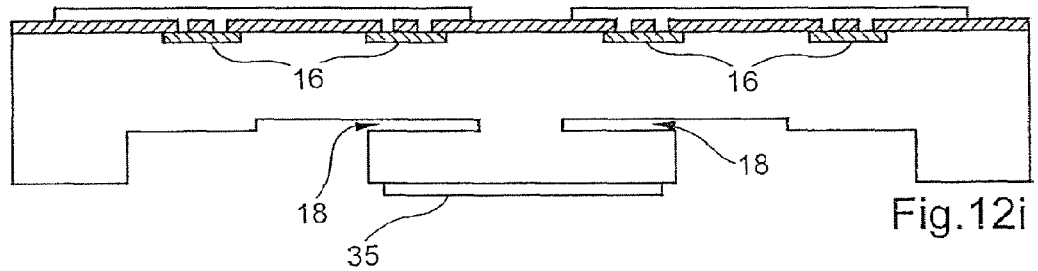

The resin-based first mask 34 and the protector layer 33 protecting the upper face of the substrate are then removed, as illustrated in FIG. 12i.

Figure 12J:
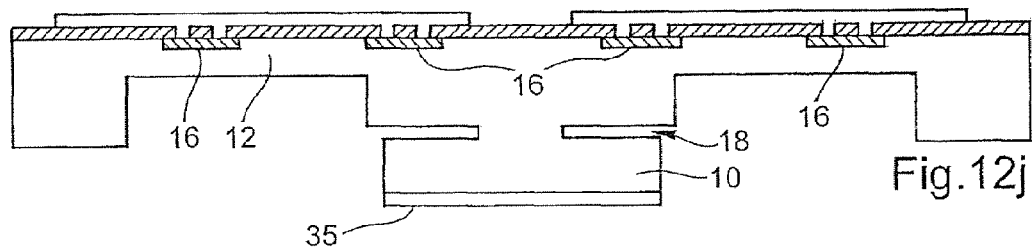

A second deep etch is performed, as illustrated in FIG. 12j, so as to produce both the plane of the membrane 12 and the body of the stem 10 where it meets the membrane 12.

Figure 12K:
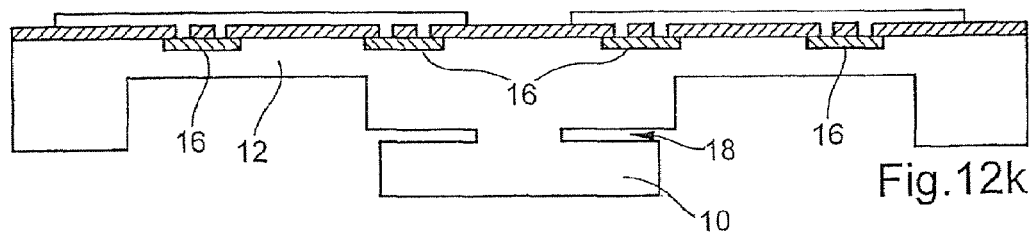

Finally, as illustrated in FIG. 12k, the oxide-based second mask 35 is removed.

Of course, the aforementioned manufacturing methods are given merely by way of nonlimiting examples.

In particular, other conventional techniques may be employed in order to produce a force measurement device according to embodiments of the invention.

In particular, the various parts of the structure could be produced by conventional machining and then assembled.

Figure 13:
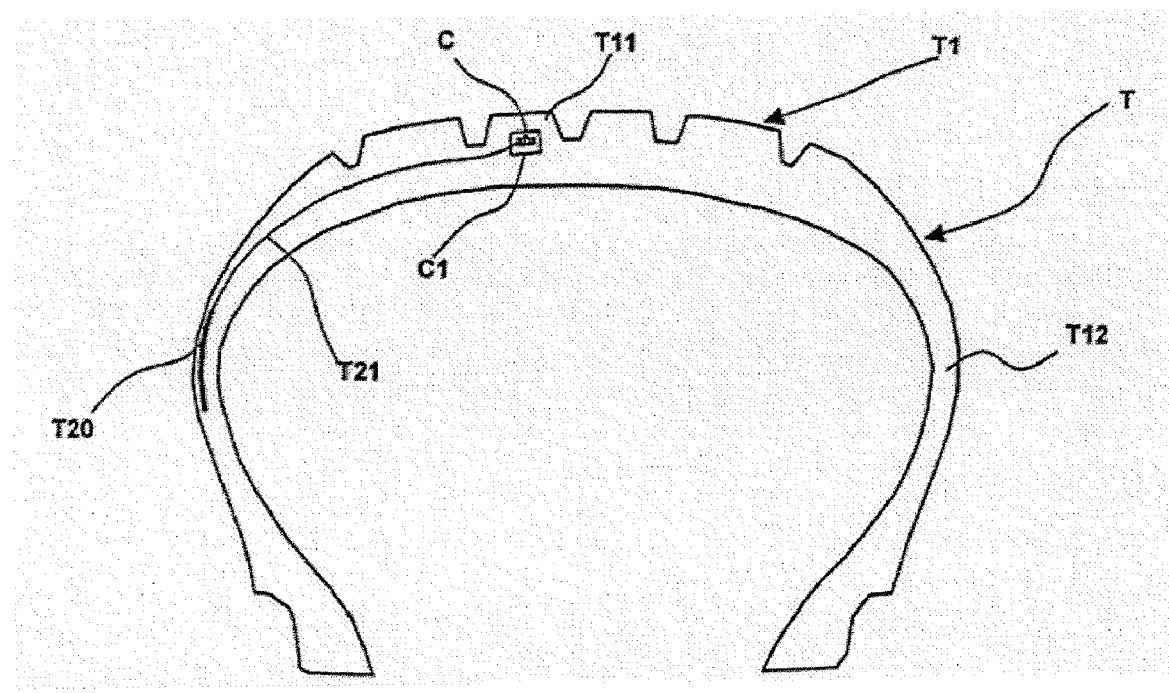
FIG. 13 depicts a meridian section of a tire the tread of which is equipped with a measurement device according to an embodiment of the invention, showing a first way of positioning such a device in a tread element of the tread.

FIG. 13 shows a tire T provided with a tread T1. The tread includes a tread element T11, namely a rib running, for example, all around the tread. The tread element T11 includes a sensor C, preferably inserted in a non-wearing part of the tread T1, as will be seen in greater detail in FIG. 14, which depicts only the tread element T11 in contact with the ground. The tire T includes a reinforcing structure T13, generally formed of textile and/or metallic threads, embedded in a filled elastomer. It goes without saying that the reinforcing structure T13 does not in itself form part of the present invention and that there is no need to recall all designs thereof in the context of the present invention.

Figure 14:
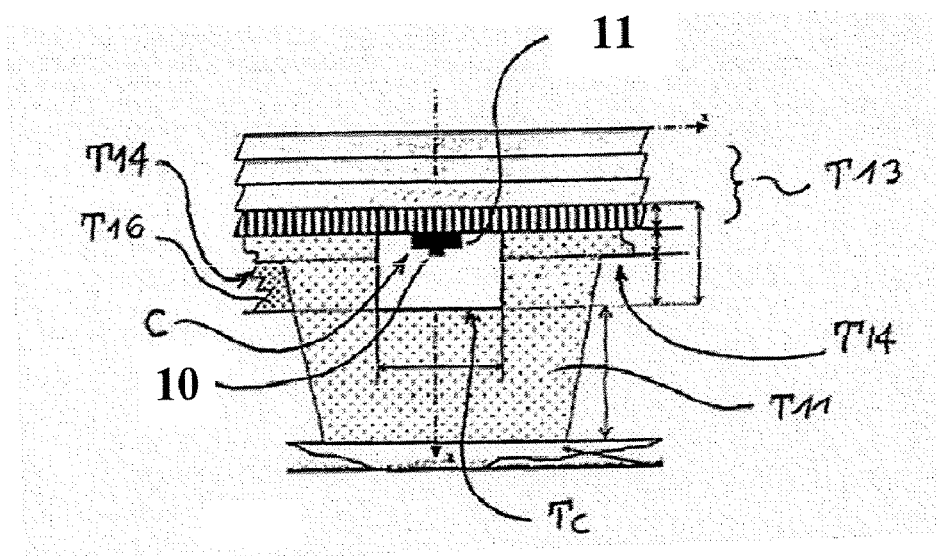
FIG. 14 is an enlargement of part of FIG. 13, showing the installation of the device in greater detail.

FIG. 14 also schematically depicts a wear indicator T16, consisting, in a way well known per se, of an excess thickness of rubber moulded in the bottom of a groove T14. A boxed region Tc represents a preferred region in which to install the sensor C in the tread T1.

In the manufacture of tires there are various steps, including a step that involves winding the tread T1 onto a tire preform. At this stage, the tire is said to be a green tire. Thereafter, in a moulding step, it is moulded and cured in a curing press, using a mould. The sensor C may be positioned, during the manufacturing process, on the reinforcing structure T13, just before the step of winding the tread T1. A person skilled in the art will be able to adapt the sensor insertion technique to suit the tire-making method used.

During the step of moulding the tire, right at the start of curing, the filled elastomer that forms the tread T1 is liable to undergo fluid displacement under the combined action of the moulding pressure and the increase in temperature. In order to prevent the sensor C from being displaced from its initial position in the green tire, it is possible to produce a premoulded and at least partially cured insert C1 (see FIG. 13) containing the sensor C. The insert C1 includes a small volume of filled elastomer, preferably of the same composition as that used for the tread T1. The insert may contain a base, a stud or studs, or an accessory, which are described below. A premoulded insert such as this may make it easier to position the various components that the insert contains accurately relative to one another and also encourages accurate positioning of all of these components within the tire. The insert C1 is, of course, installed in the boxed region Tc.

It is also possible to opt for a technique inspired by a re-capping procedure. In this procedure, a tread containing the abovementioned components is premoulded, or even at least partially precured, and attached to a preform, the combined entity undergoing the remainder of its curing as a whole in order to ensure that all these elements are firmly attached to one another.

To encourage good transmission to a sensitive or sensing part of the sensor C of the loads to which the filled elastomer, in which the sensor is inserted, is subjected, it is possible to treat the surface of the sensor C and any various components that might be used, beforehand. For example, a commercially-available product may be used, such as Chemosyl or any other product designed to ensure cohesion between a filled elastomer and some other element. A treatment of this type also has the advantage of ensuring good mutual cohesion of the various constituent parts of the tire, including the added elements, and therefore of assuring that the tire has good durability during use.

The sensor C is thus situated in that part of the tread T1 that is not subject to wear under normal tire use conditions. The sensor C itself is depicted schematically in this region, without prejudice to its precise size with respect to the tread element T11, it being possible for the tread elements to differ greatly in size and shape according to the type of the tire and the size of the tire.

The sensor C is depicted as being centered with respect to the tread element T11 in FIGS. 13 and 14 purely for illustrative purposes. It goes without saying that the sensor C can occupy a position that is not centered with respect to the tread element T11, whether this be in the longitudinal direction or in the transverse direction of this element. It may be positioned with its stem 10 directed towards the surface of the tread T1, as in FIGS. 7 to 9 and 13 to 15, or in the opposite direction, as in FIGS. 10 and 11.

Figure 15:
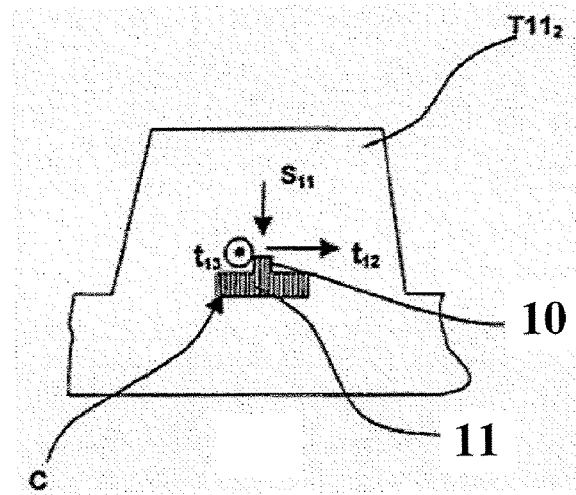
FIG. 15 depicts a second way of positioning such a device in a tread element of the tread of a tire.

Reference to FIG. 15 shows that the sensor C is able to measure three stresses: a compressive stress denoted $s_{11}$, and two shear stresses denoted $t_{12}$ and $t_{13}$. The sensor C, positioned in a non-wearing part of the tread element T11 allows the stresses in the tread element T11 to be measured throughout the life of the tire, or at least provides a representation thereof that is faithful enough that it can be used to effect. The sensor C is able to provide an indication of the load applied perpendicular to the area of contact between the tread element T11 and the ground, and indications regarding the tangential loads applied to the tread element T11 in the contact area.

When applied to a type of tire described in patent application EP1076235A1, it is possible, for example, to estimate the friction potential of the tread element T11 and the grip potential of the tire.

Figure 17:
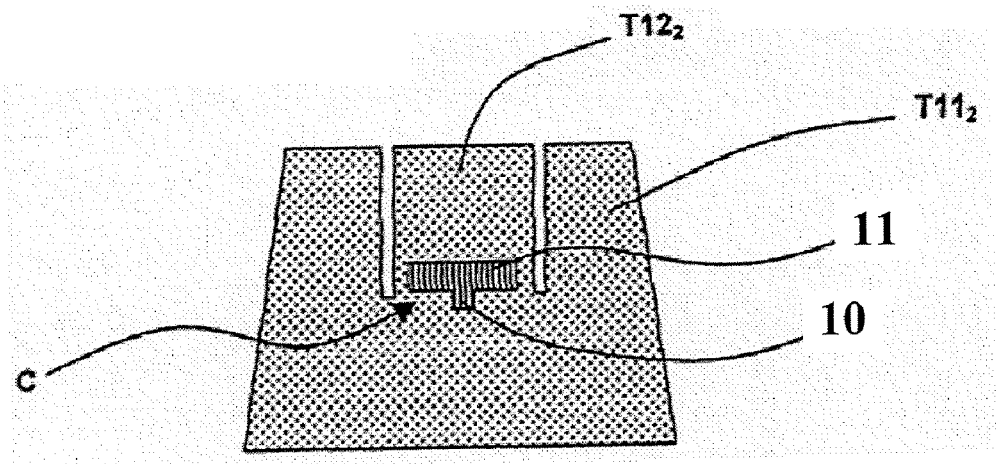
FIGS. 17 and 18 depict a fourth way of installing such a device in a tread of a tire the tread pattern of which is designed for this purpose.
Figure 18:
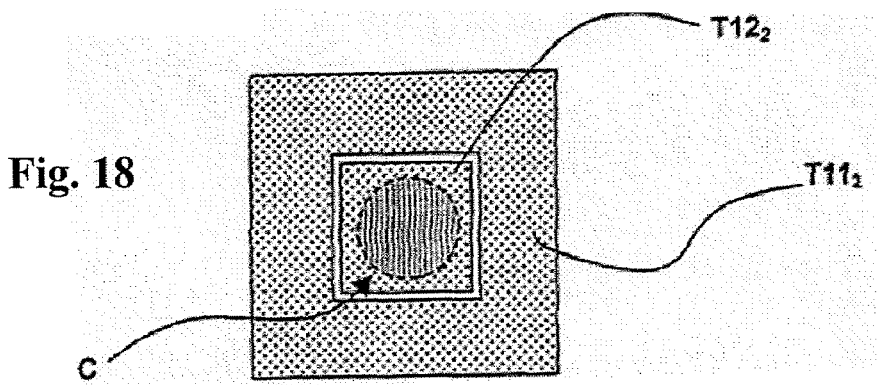

The sensor C may be inserted in a tread element T11 assumed to be continuous in the circumferential direction of the tread T1, as in FIGS. 13 and 14, or alternatively in an isolated element, such as a tread block $T11_2$, as shown in FIG. 18. Both types of tread element are mentioned in patent application EP1076235A1. Mention may also be made of patent application EP1231120A1, which describes an element such as the tread block $T11_2$ of FIGS. 17 and 18, which includes a central part $T12_2$, and its usefulness in evaluating the friction potential of the tread element T11 and the grip potential of the tire.

Additionally, the choice of direction in which the sensor C is installed is not dependent upon the type of tread element T11 with which it is associated. Only its calibration is dependent on the direction of installation and on the type of tread element T11 with which it is associated.

Figure 16:
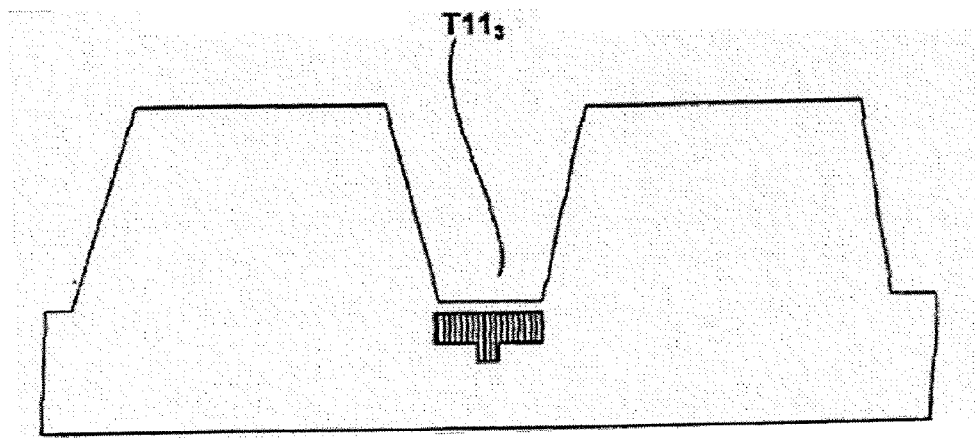
FIG. 16 depicts a third way of positioning such a device in a tread of a tyre.

FIG. 16 also illustrates a situation in which the sensor C may equally be positioned between two tread elements (isolated blocks or ribs) that are adjacent in the longitudinal or transverse direction of the tread T1, and that, once again, the stem can just as well be directed towards the surface of the tread T1 as directed towards the reinforcing structure.

The essential thing is for the sensor C to be inserted in the non-wearing region of the tread T1 to guarantee that it will work throughout the life of the tire in normal use. For a tire that includes a reinforcing structure and a tread, the tread includes a part intended to be worn, and the sensor C is therefore placed in the tread T1 between the part intended to be worn and the reinforcing structure.

Figure 19:
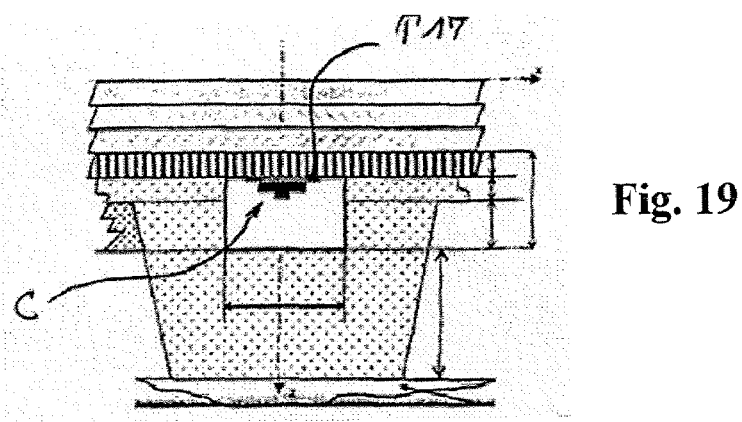
FIG. 19 shows a fifth way of positioning such a device in a tread of a tire.

According to an alternative embodiment of the invention, illustrated in FIG. 19, a rigid or semirigid accessory T17, larger in size than the sensor C itself, may be added thereto, particularly with a view to making the sensor C easier to position while the tire is being manufactured and in particular to prevent it from moving during the moulding step. The accessory T17 may be made of metal, polymer, or, alternatively, ceramic. It is preferable for the accessory T17 to be more rigid than the filled elastomer that forms the tread T1, and for the area of the accessory T17 to exceed the largest area of the sensor C. Once again, the direction in which the stem 10 of the sensor C is installed, as depicted in FIG. 19, is nonlimiting.

Figure 20:
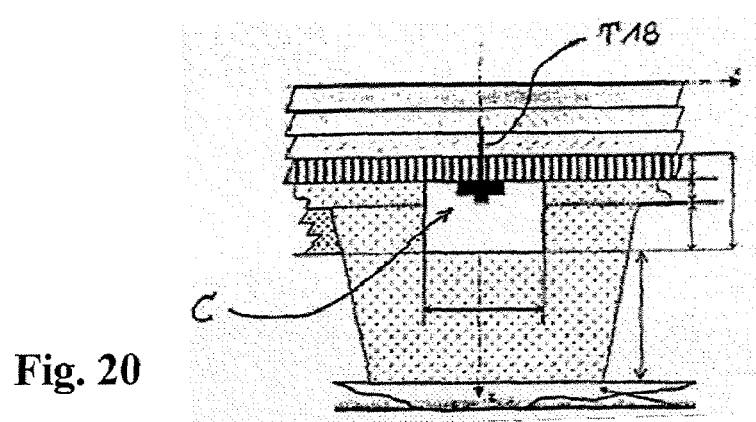
FIG. 20 shows a sixth way of positioning such a device in a tread of a tire.

According to another alternative embodiment of the invention, illustrated in FIG. 20, the sensor C may alternatively be equipped on its exterior face with one or more studs T18, again with a view to making it easier to position when manufacturing the tire and to prevent it from moving during the moulding step. The stud or studs T18 are made of a material that is preferably fairly rigid, such as, for example, a metal, a ceramic, a polymer, or, alternatively, silicon. According to a more specific arrangement of this alternative form, the stud T18 may end in a head or a hook intended to ensure even better positioning and better stability of its position during the moulding and curing step.

In particular, the two alternative forms of installation of the sensor as described hereinabove may be combined.

Figure 21:
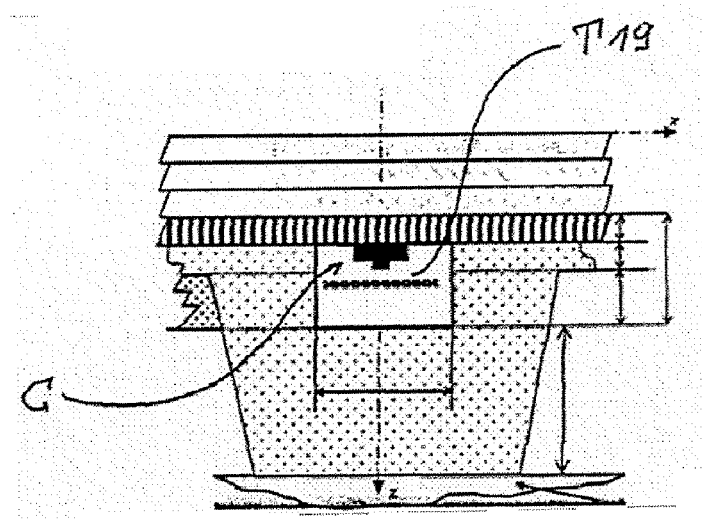
FIG. 21 shows a seventh way of positioning such a device in a tread of a tire.

Finally, according to another aspect illustrated in FIG. 21 which is entirely independent of the choice of installation of the sensor C, it may be desirable to associate with the sensor C a base T19 formed, for example, of a rigid or semirigid plate positioned in the non-wearing region of the tread, between the sensor and the ground. The benefit of a base T19 such as this is that it averages out the loads transmitted to the sensor along the vertical axis by the filled elastomer of the tread. Another benefit is that it protects the sensor, when the tire runs over a pebble or something similar. A particularly sharp pebble may cause particularly high local vertical stresses in a tread element as the tire runs along, these stresses being transmitted to the sensor via the filled elastomer that makes up the tire tread pattern, and possibly destroying the sensor. The material of which the rigid or semirigid plate element is made may, for example, be a metal, a ceramic, a polymer, silicon, or, alternatively, a composite made up of a filled elastomeric matrix and a material such as those used to produce reinforcing structures for tires. Of course, the rigidity of the base T19 needs to be greater than that of the filled elastomer of which the tread is made, and the base T19 needs to be capable of averaging out the stresses transmitted by the roughness of the ground. The surface area of the base T19 is preferably at least equal to that of the sensor, and preferably is at most equal to the surface area of the tread element T11.

For the sensor to work, it requires at least measurement electronics, a power supply, and a system for coding and transmitting the data to the vehicle.

The measurement electronics for its part may be in the form of a very small ASIC either attached to the sensor itself, such as, for example, within the insert, or positioned beside it, preferably on the opposite side to the sensitive part of the sensor.

The sensor C may be powered by a power supply such as a cell or microbattery inserted, with the sensor C, for example, in a premoulded insert. Connections similar to those described earlier may be provided for connecting the sensor C to the power supply. In another configuration, this power supply may be a remote supply. The data may be transmitted to the vehicle using conventional remote transmission techniques. The information coding electronics are incorporated in the form of an ASIC and connected to an antenna, for example an electric field antenna of the quarter-wave type, positioned in the tread. All of these elements are preferably incorporated, with the sensor and the measurement electronics, in an insert as described hereinabove. The material and shape of the antenna are chosen such as not to downgrade the endurance of the tire.

Another solution is to power the sensor remotely using a conventional remote powering method. For example, an antenna T20 of the loop type, termed a secondary antenna, may be positioned in the filled elastomer compound that makes up a sidewall T12 of the tire T, or under the tread T1. This secondary antenna is electrically connected to the sensor electronics by a cable T21. An antenna, termed the primary antenna (not depicted), is positioned on the vehicle facing the secondary antenna. The power source is in the vehicle; for example, it is the vehicle battery. Power is transmitted from the stationary primary antenna positioned on the vehicle to the secondary antenna that rotates with the tire and is electrically connected to the sensor C by inductive coupling. In such a case, data is transmitted by these antennas, for example, using frequency modulation or amplitude modulation of the power signal.

Figure 22:
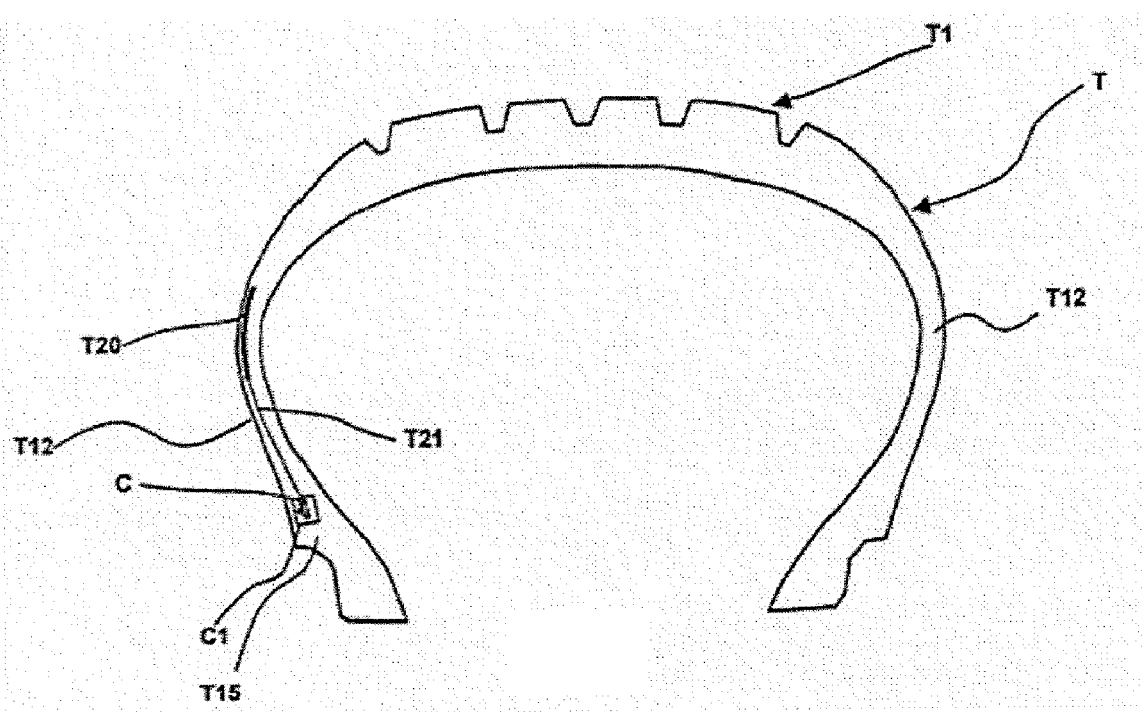
FIG. 22 shows a way of positioning such a device between the sidewall and the bead of a tire.
Figure 23:
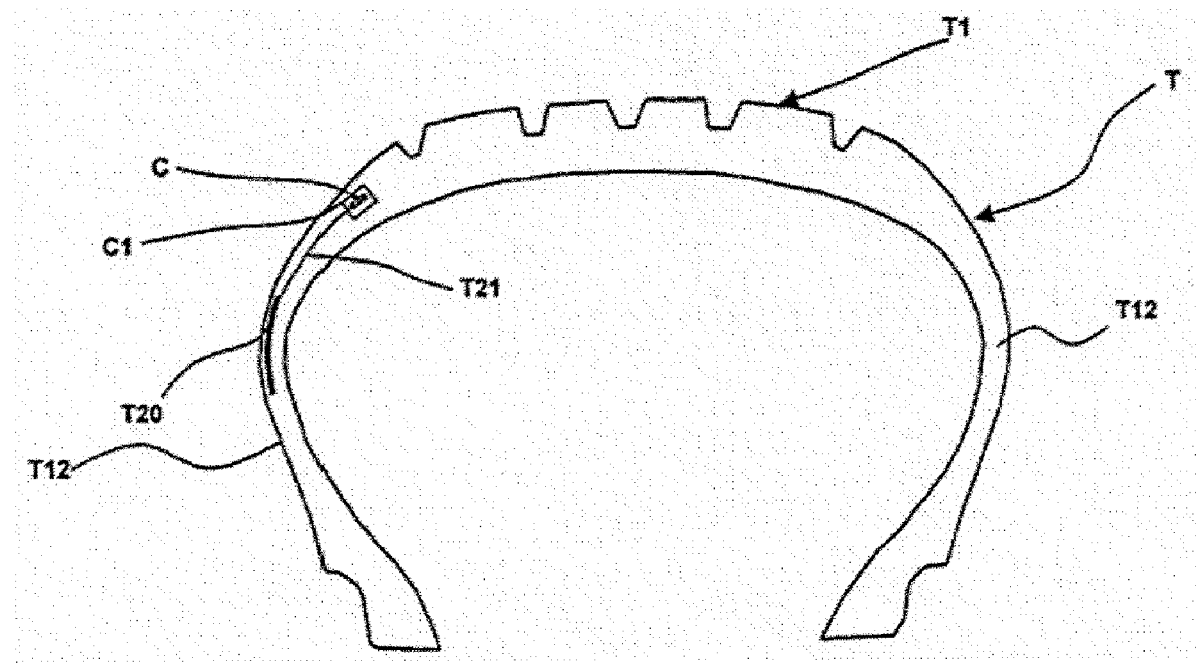
FIG. 23 shows a way of positioning such a device in a shoulder of a tire.

FIGS. 22 and 23 illustrate, from among numerous possible alternative installations, two more installations in a non-wearing part of the tire. In FIG. 22, the sensor C is inserted between the sidewall T12 and the bead T15. In FIG. 23, the sensor C is inserted between the sidewall T12 and the tread T1, that is, in the shoulder of the tire T. Obviously, it does not take measurements from the tread. The sensor C, wherever in the tire T it is fitted, allows for the measurement of the compressive stress $s_{11}$, and the two shear stresses denoted $t_{12}$ and $t_{13}$ (see FIG. 15) at the point at which the sensor C is installed. It may also be seen that the sensor C can be connected to the antenna T20 by the cable T21.

The invention claimed is:

1. A tire comprising a force measurement device, wherein the device includes:
   a rigid stem that includes a portion arranged to contact with a tire region on which a force can act, wherein the portion includes an anchor arranged to collaborate with the tire region, and wherein the anchor includes at least one crenellation; and
   a deformable membrane connected to the stem, the membrane being substantially flat and including a detector that detects a deformation of the membrane.

2. A tire according to claim 1, wherein the anchor includes at least one crenellation arranged perpendicular to the membrane.

3. A tire according to claim 1, wherein the anchor includes at least one crenellation arranged parallel to the membrane.

4. A tire according to claim 3, wherein the anchor includes at least one crenellation arranged perpendicular to the membrane.

5. A tire according to claim 1, wherein the anchor includes crenellations that open toward a longitudinal wall of the stem and toward a face of a free end of the stem.

6. A tire according to claim 2, wherein the anchor includes a plurality of crenellations arranged perpendicular to the membrane, the plurality of crenellations being distributed symmetrically with respect to a longitudinal central axis of the stem.

7. A tire according to claim 3, wherein the anchor includes a plurality of crenellations arranged parallel to the membrane, the plurality of crenellations being distributed symmetrically with respect to a longitudinal central axis of the stem.

8. A tire according to claim 4, wherein the anchor includes a plurality of crenellations distributed symmetrically with respect to a longitudinal central axis of the stem.

9. A tire according to claim 1, wherein the anchor is formed at a widened portion of the stem.

10. A tire according to claim 9, wherein the widened portion has a shape of a cone frustum, and wherein a widened base of the cone frustum constitutes a free end of the stem.

11. A tire according to claim 1, wherein the portion of the stem is configured to be embedded in the element.

12. A tire according to claim 1, further comprising a reinforcing structure and a tread, wherein the tread includes a part that is intended to be worn, and wherein the device is positioned in the tread between the part that is intended to be worn and the reinforcing structure.

13. A tire according to claim 1, further comprising a sidewall and a bead, wherein the device is installed between the sidewall and the bead.

14. A tire according to claim 1, further comprising a sidewall and a shoulder, wherein the device is installed between the sidewall and the shoulder.

15. A tire comprising a force measurement device, wherein the device includes:
  a rigid stem that includes a portion arranged to contact with a tire region on which a force can act, wherein the portion includes an anchor arranged to collaborate with the tire region, wherein the anchor is formed at a widened portion of the stem, wherein the widened portion has a shape of a cone frustum, and wherein a widened base of the cone frustum constitutes a free end of the stem; and
  a deformable membrane connected to the stem, the membrane being substantially flat and including a detector that detects a deformation of the membrane.

* * * * *